(12) United States Patent
Knight (10) Patent No.: US 9,359,029 B2
(45) Date of Patent: *Jun. 7, 2016

(54) WEIGHT TRANSFERRING TOW DOLLY

(71) Applicant: Kenneth Lee Knight, Deer Park, WA (US)

(72) Inventor: Kenneth Lee Knight, Deer Park, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/584,963

(22) Filed: Dec. 29, 2014

(65) Prior Publication Data

US 2015/0115570 A1 Apr. 30, 2015

Related U.S. Application Data (63) Continuation of application No. 13/754,741, filed on Jan. 30, 2013, now Pat. No. 8,919,802.

(51) Int. Cl.
| | | |
|---|---|---|
| B62D 63/08 | (2006.01) | |
| B62D 63/06 | (2006.01) | |
| B60P 3/40 | (2006.01) | |
| B60D 1/66 | (2006.01) | |
| B60D 1/07 | (2006.01) | |
| B60D 1/24 | (2006.01) | |
| B60G 11/27 | (2006.01) | |

(52) U.S. Cl.
CPC ............ *B62D 63/065* (2013.01); *B60D 1/07* (2013.01); *B60D 1/247* (2013.01); *B60D 1/665* (2013.01); *B60G 11/27* (2013.01); *B60P 3/40* (2013.01); *B60G 2300/402* (2013.01); *B62D 63/062* (2013.01)

(58) Field of Classification Search
CPC ............ B60G 2300/402; B62D 53/0864; B60D 1/075; B60D 1/665

USPC .......................................................... 280/404

See application file for complete search history.

(56) References Cited

U.S. PATENT DOCUMENTS

| | | | |
|---|---|---|---|
| 3,393,922 A | | 7/1968 | Adams |
| 3,436,096 A | | 4/1969 | Rogge |
| 3,447,813 A | * | 6/1969 | Wolf ............................ 280/80.1 |
| 3,532,236 A | | 10/1970 | Hostetler |
| 3,752,496 A | | 8/1973 | Meinecke, Jr. |
| 3,895,818 A | | 7/1975 | Fearon |
| 3,944,256 A | | 3/1976 | Hart et al. |
| 3,980,313 A | | 9/1976 | Meinecke, Jr. |
| 4,162,082 A | | 7/1979 | Curry |
| 4,226,437 A | | 10/1980 | Trudeau |
| 4,239,253 A | | 12/1980 | Golze |
| 4,253,679 A | | 3/1981 | Sargent |
| 4,740,005 A | * | 4/1988 | Babin ......................... 280/407.1 |
| 4,968,210 A | | 11/1990 | Friederich |
| 5,090,720 A | | 2/1992 | Heider et al. |
| 5,387,002 A | | 2/1995 | Grevich |
| 5,620,194 A | | 4/1997 | Keeler et al. |
| 5,626,356 A | | 5/1997 | Harwood |
| 5,924,716 A | | 7/1999 | Burkhart et al. |

(Continued)

*Primary Examiner* — Kevin Hurley
*Assistant Examiner* — Michael Stabley
(74) *Attorney, Agent, or Firm* — Dorsey & Whitney LLP (57) ABSTRACT

My weight transferring tow dolly is releasably attachable to a receiver hitch of a towing vehicle such as a pickup truck and generally provides a dolly frame formed of plural structurally interconnected box beams having a height adjustable suspension carrying an axle with wheels and tires at opposing end portions, and a support frame to partially support the weight of a carried load and to move the center of gravity of a loaded towing vehicle forwardly to increase the stability of the towing vehicle.

20 Claims, 5 Drawing Sheets

(56) References Cited

U.S. PATENT DOCUMENTS

| | | |
|---|---|---|
| 6,073,946 A | 6/2000 | Richardson |
| 6,311,993 B1 | 11/2001 | Hulstein et al. |
| 6,733,028 B2 | 5/2004 | Teeple |
| 6,758,535 B2 | 7/2004 | Smith |
| 6,820,887 B1 | 11/2004 | Riggle |
| 8,132,999 B2 * | 3/2012 | Lundin .......... 414/495 |
| 8,317,452 B2 * | 11/2012 | Lundin .......... 414/482 |
| 8,919,802 B2 | 12/2014 | Knight |
| 2003/0038454 A1 | 2/2003 | Valencia |
| 2010/0289250 A1 | 11/2010 | Fankhauser et al. |

* cited by examiner

WEIGHT TRANSFERRING TOW DOLLY

CROSS-REFERENCE TO RELATED APPLICATION(S)

This application is a continuation of U.S. patent application Ser. No. 13/754,741 filed Jan. 30, 2014, which issued as U.S. Pat. No. 8,919,802 on Dec. 30, 2014, and is hereby incorporated by reference herein, in its entirety, for any purpose.

FIELD OF INVENTION

This invention relates to land vehicles, and more particularly to a towable weight transferring dolly.

BACKGROUND OF THE INVENTION

Pickup trucks are a popular style of motor vehicle and are no longer used solely for carrying cargo and loads, but also for general transport and commuting. The popularity of pickup trucks has steadily increased over the recent years. Pickup trucks have an occupant compartment (the "cab") at a somewhat forward end portion that historically has had two doors and a single bench seat for two and perhaps three passengers, and a rearward cargo bed that was commonly 8 feet in length. More recently, pickup trucks having a "crew cab" which is characterized by having 4 doors and a rear seat have become increasingly popular because they provide a vehicle capable of transporting four or more adults as well as cargo in the truck bed.

Unfortunately, the addition of two additional doors and a back seat has necessitated that the overall length of the pickup truck be increased. Although the addition of the additional doors and a backseat has been a huge benefit, and made pickup trucks increasing popular and more versatile, the increased length has decreased the maneuverability, and convenience of pickup trucks, because the great length makes such vehicles difficult to park and maneuver.

In an effort to resolve the decrease in maneuverability, and the difficulty in parking, manufacturers have resorted to promoting, and the consuming public has generally accepted such four-door pickup trucks having a shorter six-foot cargo bed rather than the standard longer eight-foot cargo bed. Because owners are more commonly using pickup trucks as a primary mode of transportation and for commuting, the reduced length of the cargo bed has not been a significant detriment. When an operator desires to transport a larger or longer item within the cargo bed, the operator may "lower" the bed tailgate and allow the longer item to extend rearwardly beyond the rearward end of the tailgate and the pickup truck bed. With some limitations, traffic laws and regulations permit cargo items to extend rearwardly beyond the rearward end of vehicle, so long as the protruding item does not extend too far, is properly secured, and a visible "warning flag" is attached to the rearward most end of the item so that it is clearly visible to other drivers and vehicle operators.

Although allowing the cargo to extend beyond the lowered tailgate has resolved some problems associated with the smaller 6 foot bed, difficulty continues when the item being transported in the bed is longer than the six-foot bed and is heavy toward a rearward end portion. In such instances, the cargo may change the center of gravity of the pickup truck which reduces the maneuverability and the stability of the pickup truck on the roadway because so much weight is carried rearward of pickup truck's rear tires. Such rearward loading causes the pickup truck's rear tires to act as a fulcrum (a teeter totter) responsively causing the pickup truck's front tires to have less downward force and therefore less stability.

One type of cargo commonly carried within a pickup truck bed that causes this problem is truck campers. Truck campers may have a wide variety of configurations, but are typically somewhat boxlike structures that define an interior living space which may include beds, bathrooms, appliances, and the like. Truck campers provide a popular means of combining outdoor recreation while maintaining certain "comforts of home" and are becoming increasingly popular. Typically, larger and heavier truck campers are more opulent and therefore more popular. A pickup truck must be able to support the size and weight of the truck camper within the truck bed, and the carriage of the truck camper within the truck bed must not significantly negatively impact the stability, drivability and maneuverability of the pickup truck.

Unfortunately, a four-door pickup truck having a six-foot bed that is maneuverable and convenient to use and drive has less ability to carry a long and heavy truck camper because the truck bed is shorter. Purchasers, owners and operators are therefore frequently forced to choose between the pickup truck they desire, and the truck camper they desire because the characteristics of the pickup truck that make it so desirable, make it less capable of carrying the larger more opulent truck campers that are more desirable.

Some pickup truck owners have resorted to carrying "oversize" truck campers within six-foot cargo beds and have "accepted" the lessened stability and drivability of the pickup truck when the truck camper is within the bed. Unfortunately, oversized truck campers have increased risk and decreased safety for the pickup truck operator as well as other citizens using the roadways. A similar situation develops when a load of 8' or 10' lumber is carried in a 6 foot pickup truck bed.

What is needed is an apparatus that is easily and releasably attachable to a pickup truck which allows the pickup truck to carry cargo items that extended beyond the pickup truck bed and simultaneously supports of the weight of the protruding item and prevents the cargo from decreasing the stability and maneuverability of the pickup truck.

My weight transferring tow dolly seeks to overcome these and other drawbacks to pickup trucks carrying oversize and heavy cargo, including oversized truck campers, by providing a weight transferring tow dolly that is releasably attachable to a trailer hitch of a pickup truck, that supports cargo items extending rearwardly from the pickup truck and prevents the center of gravity of the pickup truck from moving rearwardly due to the weight of the cargo within the pickup truck bed.

My invention does not reside in any single one of the identified features individually but rather in the synergistic combination of all of its structures, which give rise to the functions necessarily flowing therefrom as hereinafter claimed.

Some or all of the problems explained above, and other problems, may be helped or solved by my invention shown and described herein. My invention may also be used to address other problems not set out herein or which become apparent at a later time. The future may also bring to light unknown benefits which may be in the future appreciated from the novel invention shown and described herein.

SUMMARY OF THE INVENTION

Our weight transferring tow dolly is releasably attachable to a receiver hitch of a towing vehicle such as a pickup truck and generally provides a dolly frame of structurally interconnected box beams, a height adjustable suspension carrying an axle with wheels and tires at opposing end portions, and a support frame to partially support the weight of a load and to move the center of gravity of a loaded towing vehicle forwardly.

In providing such a weight transferring tow dolly apparatus it is:

a principal object to provide a weight transferring tow dolly that partially supports the rearward weight of an over-length load.

a further object to provide a weight transferring tow dolly that moves the center of gravity of a loaded towing vehicle forwardly.

a further object to provide such a weight transferring tow dolly that allows a pickup truck to carry an oversize truck camper.

a further object to provide such a weight transferring tow dolly that may be towed by a vehicle other than a truck.

a further object to provide such a weight transferring tow dolly that maintains the stability of a towing vehicle carrying an over-length load.

a further object to provide such a weight transferring tow dolly that releasably attaches to a towing vehicle using a standard receiver type towing hitch.

a further object is to provide such a weight transferring tow dolly that carries a towing hitch at a rearward end portion to allow a trailer to be towed therebehind.

a further object to provide such a weight transferring tow dolly that has an adjustable suspension.

a further object to provide such a weight transferring tow dolly having a suspension that incorporates pneumatics to allow the height of the weight transferring tow dolly to be adjustable.

a further object to provide such a weight transferring tow dolly that uses inflatable airbags to adjust the amount of weight supported by the weight transferring tow dolly.

a further object to provide such a weight transferring tow dolly that uses pneumatics to force the front tires of a towing vehicle downwardly against the supporting surface to enhance stability.

a still further object to provide such a weight transferring tow dolly that is new and novel in design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention it is to be understood that its structures and features are susceptible to change in design and arrangement with only one preferred and practical embodiment of the best known mode being illustrated in the accompanying drawings and specified as is required.

BRIEF DESCRIPTION OF THE DRAWINGS

Specific forms, configurations, embodiments and/or diagrams relating to and helping to describe preferred versions of the invention are explained and characterized herein, often with reference to the accompanying drawings. The drawings and all features shown therein also serve as part of the disclosure of the invention whether described in text or merely by graphical disclosure alone. Such drawings are briefly described below.

DETAILED DESCRIPTION OF PREFERRED EMBODIMENTS

Introductory Notes

The readers of this document should understand that the embodiments described herein may rely on terminology used in any section of this document and other terms readily apparent from the drawings and the language common therefore as may be known in a particular art and such as known or indicated and provided by dictionaries. Widely known and used in the preparation hereof are Webster's Third New International Dictionary (© 1993), The Oxford English Dictionary (Second Edition, © 1989), The New Century Dictionary (© 2001-2005) and the American Heritage Dictionary of the English Language (4th Edition © 2000) all of which are hereby incorporated by reference for interpretation of terms used herein and to more adequately or aptly describe various features, aspects and concepts shown or otherwise described herein using more appropriate words having meanings applicable to such features, aspects and concepts.

This document is premised upon using one or more terms for features shown in one embodiment that may also apply to or be combined with other embodiments for similar structures, functions, features and aspects of the invention. Wording used in the claims is also descriptive of the invention and the text of both the claims and the abstract are incorporated by reference into the description entirely.

The readers of this document should further understand that the embodiments described herein may rely on terminology and features used in any section or embodiment shown in this document and other terms readily apparent from the drawings and language common or proper therefore.

As used herein, the term "forward", its derivatives, and grammatical equivalents refers to the portion of my weight transferring tow dolly that is closest to a towing vehicle. The term "rearward", its derivatives, and grammatical equivalents refers to the portion of my weight transferring tow dolly most distant from the towing vehicle. The term "outer", its derivatives, and grammatical equivalents refers to the driver's side or passenger side of my weight transferring tow dolly as opposed to a laterally medial portion of my weight transferring tow dolly.

My weight transferring tow dolly 9 generally provides a dolly frame 11 having a suspension 16 with an axle 10 and a support frame 51 and is releasably attachable to a receiver type towing hitch 72 carried at a rearward end portion of a towing vehicle 70 which may be a pickup truck.

The dolly frame 11 is formed of a first forward transverse frame beam 36, a second medial transverse frame beam 37, and a third rearward transverse frame beam 38. Each transverse frame beam 36, 37, 38 has two opposing end portions 36a, 36b, 37a, 37b, 38a, 38b respectively which structurally communicate with fender mounting beams 34. The transverse frame beams 36, 37, 38 are preferably box beams and are generally equally spaced apart from one another from front to rear and extend generally horizontally relative to supporting ground surface 74.

A tow beam 30, which is preferably a box beam, extends perpendicularly to the transverse frame beams 36, 37, 38 and is positioned generally medially between the opposing end portions 36a, 36b, 37a, 37b, 38a, 38b. The tow beam 30 has a forward end portion 30a, a rearward end portion 30b, a top surface 30c and a bottom surface 30d. The bottom surface 30d of the tow beam 30 structurally communicates with a top surface of the first forward transverse beam 36 and gussets 27 provide additional strength to the interconnection. The top surface 30c of the tow beam 30 structurally communicates with bottom surface of the second medial transverse frame beam 37 and gussets 27 provide additional strength to the interconnection. A receiver hitch insert 20 is structurally carried at the forward end portion 30a and is axially aligned therewith. The receiver hitch insert 20 has a square cross-section (not shown) and is preferably formed of a section of a solid beam. The receiver hitch insert 20 may be releasably interconnected to the towing hitch 72 of the towing vehicle 70 and the square configuration of the receiver hitch insert 20 slidably axially engages with a box beam channel (not shown) defined by the towing hitch 72. The square cross-section (not shown) of the receiver hitch insert 20 and the box beam channel (not shown) defined by the towing hitch 72 prevent any lateral vertical and rotational movement between the receiver hitch insert 20 and the towing hitch 72.

The rearward end portion 30b of the tow beam 30 extends rearwardly of the third transverse frame beam 38 and structurally carries box beam receiver hitch 22 at the rearward end portion 30b. The box beam receiver hitch 22 defines a rectilinear medial channel (not shown) configured to axially slidably removably carry a receiver hitch stinger 25 which preferably carries at least one hitch ball 26, to which a trailer hitch (not shown) of a trailer (not shown) may releasably engage in order to tow a trailer (not shown) behind the weight transferring tow dolly 9.

Figure 4:
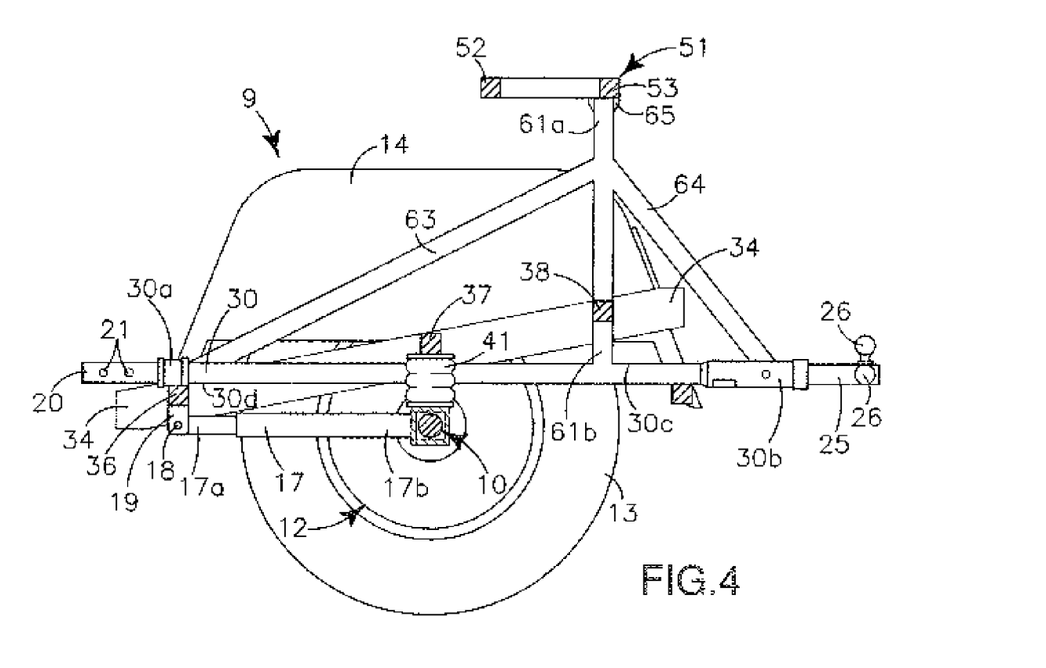
FIG. 4 is an orthographic cross section view thereof.
Figure 5:
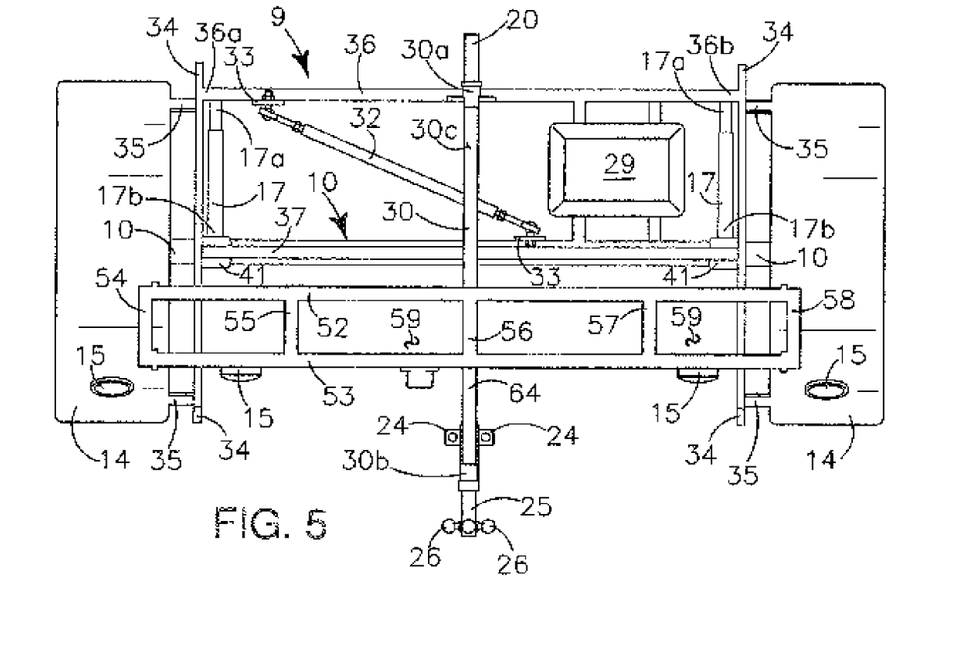
FIG. 5 is an orthographic plan view thereof.
Figure 6:
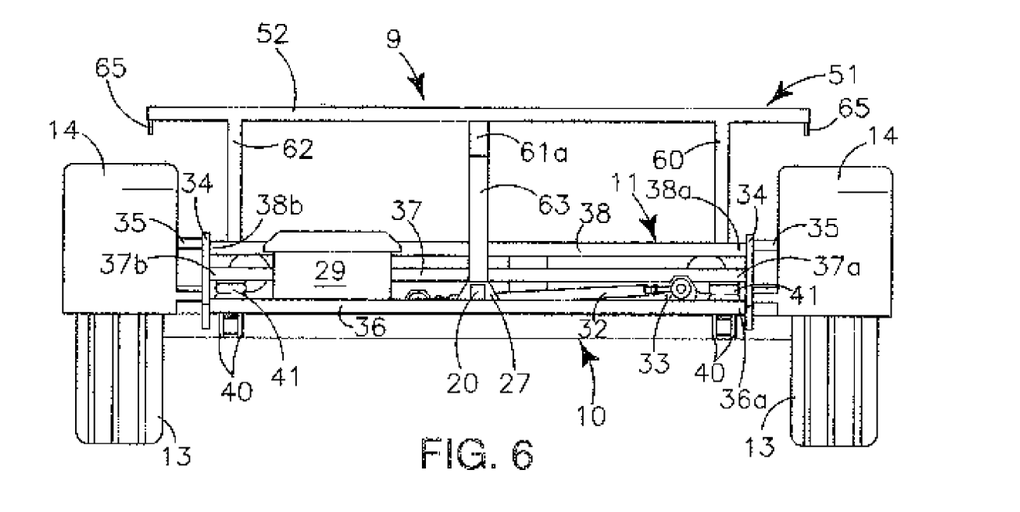
FIG. 6 is an orthographic front, rearward looking view thereof.
Figure 7:
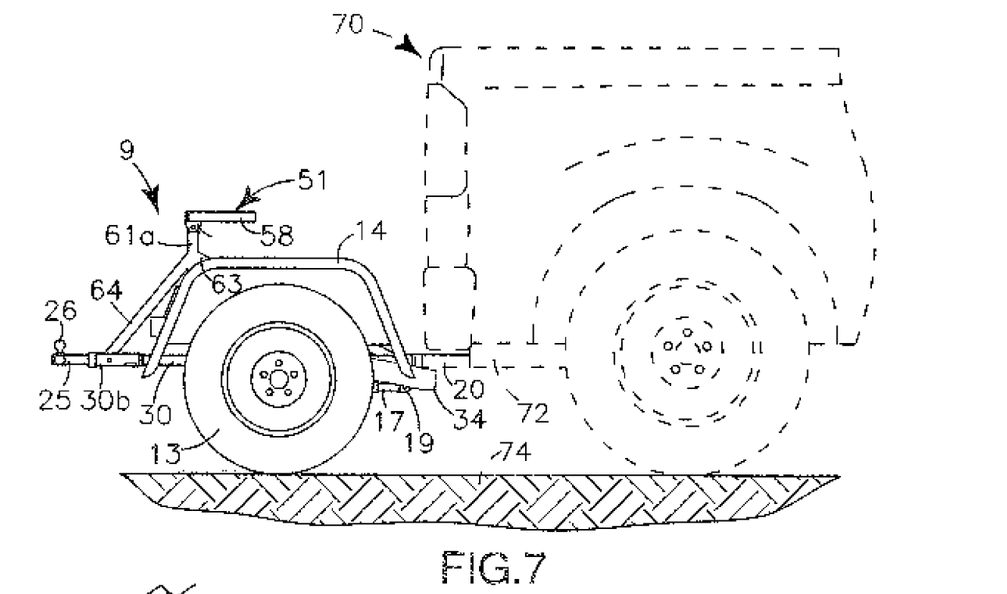
FIG. 7 is an orthographic passenger side view of the weight transferring tow dolly interconnected with a receiver hitch of a towing vehicle pickup truck, shown in dashed outline.
Figure 8:
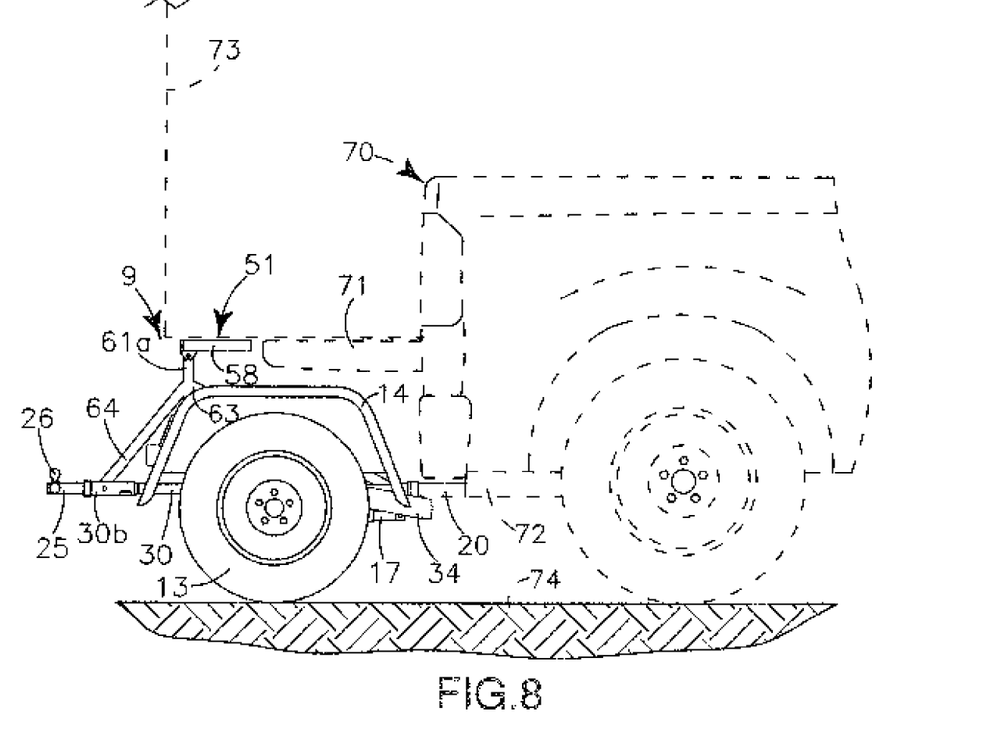
FIG. 8 is an orthographic passenger side view, similar to that of FIG. 7, showing a tailgate of the towing vehicle pickup truck (shown in dashed outline) lowered to a horizontal (open) position to the same vertical height as the support frame and a truck camper (shown in dashed outline) carried within the pickup truck bed.

As shown in FIG. 4, the first forward transverse frame beam 36 is closest to the ground surface 74, the second medial transverse frame beam 37 is slightly vertically higher than the first transverse frame beam 36, and the third transverse frame beam 38, which structurally communicates with support leg 61 at a generally medial lateral position is vertically higher than both the first transverse frame beam 36 and the second transverse frame beam 37.

Fender mounting beams 34 structurally carried at the opposing lateral end portions 36a, 36b, 37a, 37b, 38a, 38b of the transverse frame beams 36, 37, 38 are angulated upwardly toward the rearward end of the tow dolly 9. The rearward upward angulation of the fender mounting beams 34 allows the fender mounting beam to simultaneously structurally interconnect with all these transverse frame beams 36, 37, 38 and accommodates the differing vertical heights of the transverse frame beams 36, 37 and 38 and provides rigidity and strength to the dolly frame 11.

Fenders 14 are carried by the fender mounting beams 34 laterally outwardly thereof to substantially surround foreword, upper and rearward portions of tires 13 in order to prevent the tires 13 from "casting off" debris, such as rock, sand and gravel that might cause damage to vehicles and persons. In the preferred embodiment, the fenders 14 are structurally attached to the fender mounting beams 34 by fender brackets 35 that extend therebetween and space the fenders 14 laterally outwardly from the dolly frame 11. The configuration of the fenders 14 and the lateral spacing of the fenders 14 away from the dolly frame 11 may be altered and adjusted during manufacture to accommodate the tires 13 and wheels 12 carried by the axle 10.

Axle 10 carries a rotatable wheel hub (not shown) at each opposing end portion and a wheel 12 carrying a tire 13 is fastened to each wheel hub (not shown) using known threaded wheel studs (not shown) and lug nuts. The wheel hubs (not shown) allow the wheels 12 and tires 13 to rotate independent of one another.

The suspension 16 interconnects the dolly frame 11 and the axle 10 and has similar components at each lateral side portion of the dolly frame 11. The suspension 16 has swing arms 17, swing arm brackets 19, swing arm axles 18 and in the preferred embodiment air bags 41. A pair of spaced apart swing arm brackets 19 are structurally interconnected to a bottom surface of the forward transverse frame beam 36 proximate each lateral end portion 36a, 36b and extended downwardly therefrom. The swing arm brackets 19 define a medial hole (not shown) proximate an end portion opposite the first transverse frame beam 36 to carry a swing arm axle 18 extending therethrough to pivotally attach the swing arm 17 to the swing arm brackets 19. The swing arms 17 are preferably formed of sections of box beam and each swing arm 17 has a forward end portion 17a and an opposing rearward end portion 17b. A swing arm axle hole (not shown) is defined in the forward end portion 17a of each swing arm 17 to journal the swing arm axle 18.

In the preferred embodiment the axle 10 is secured to the swing arms 17 proximate the rearward end portions 17b thereof with U-bolts 40 that simultaneously extend over and about the axle 10 and the swing arm 17, and engage with a U-bolt bracket (not shown). Threaded nuts are used to secure the U-bolt brackets to the U-bolts 40, responsively securing the axle 10 to the swing arms 17. In an alternative embodiment it is contemplated the axle 10 may be structurally attached to the swing arm 17 such as by welding. The length of the swing arms 17 between the forward end portion 17a where the swing arm axle 18 is carried and the rearward end portion 17b provides mechanical leverage to the swing arms 17 which allows significant upward vertical force to be exerted on the dolly frame 11 as the rearward end portions 17b of the swing arms 17 pivot downwardly away from the dolly frame 11.

A sway bar 32 communicates between the axle 10 and the dolly frame 11 and is attached to the axle 10 and the dolly frame 11 with sway bar brackets 33. The sway bar 32 dampens vibration and lateral motion of the axle 10 relative to the dolly frame 11 and adds stability when the tow dolly 9 is being towed.

Air bags 41 are positioned between an upper surface of each swing arm 17 proximate the rearward end portion 17b opposite the swing arm axle 18, and a bottom surface of the second medial transverse frame beam 37. The air bags 41 are positionally secured to the upper surface of each swing arm 17 and the bottom surface of the second medial transverse frame beam 37 with air bag mounting brackets 42. The position of the air bags 41 relative to the swing arm axles 18 and the pivotal interconnection of the swing arms 17 to the dolly frame 11 allow the swing arms 17 to pivot relative to the dolly frame 11 when the airbags 41 expand and contract responsive to inflation and deflation.

Figure 2:
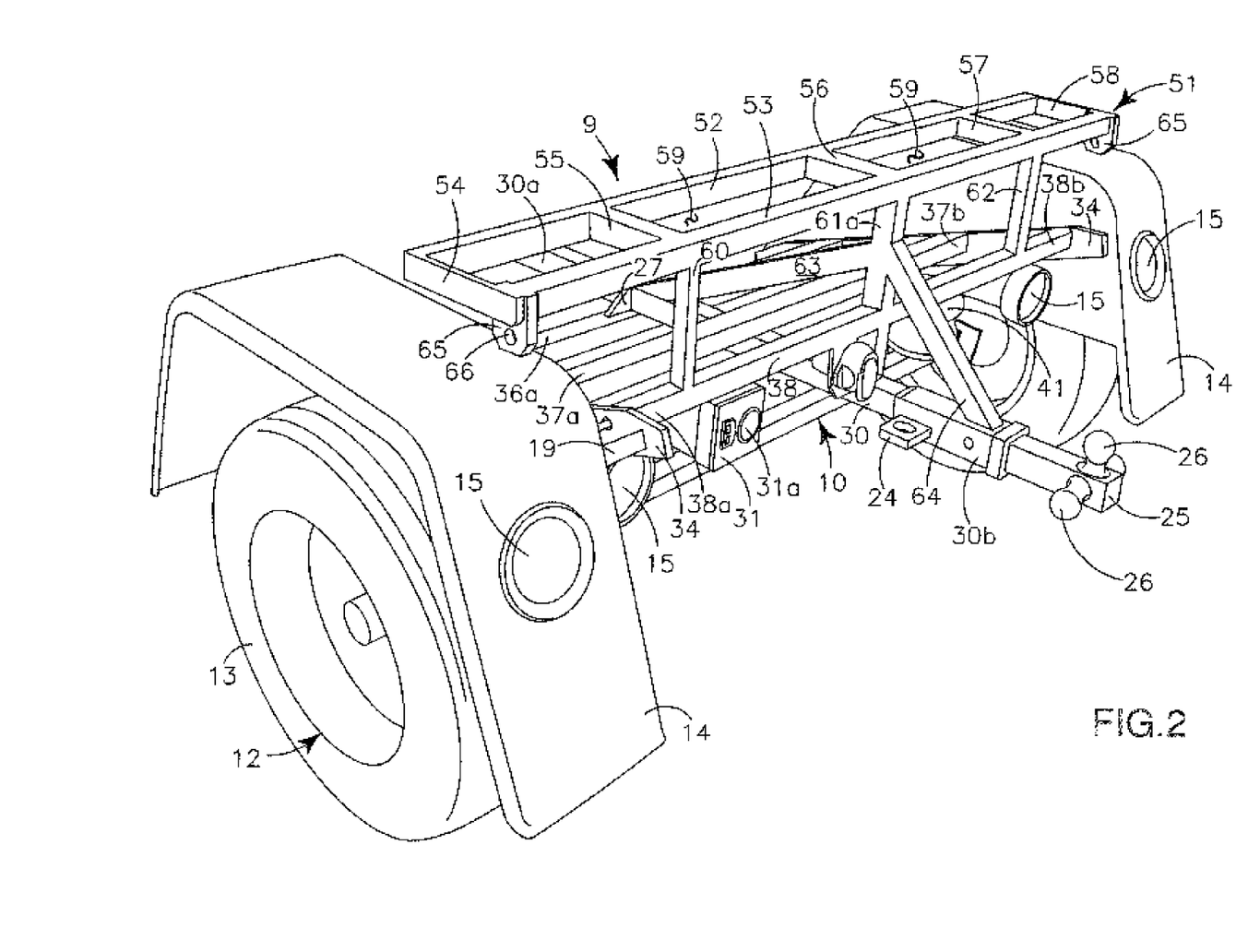
FIG. 2 is an isometric view back, driver's side and top view thereof.
Figure 3:
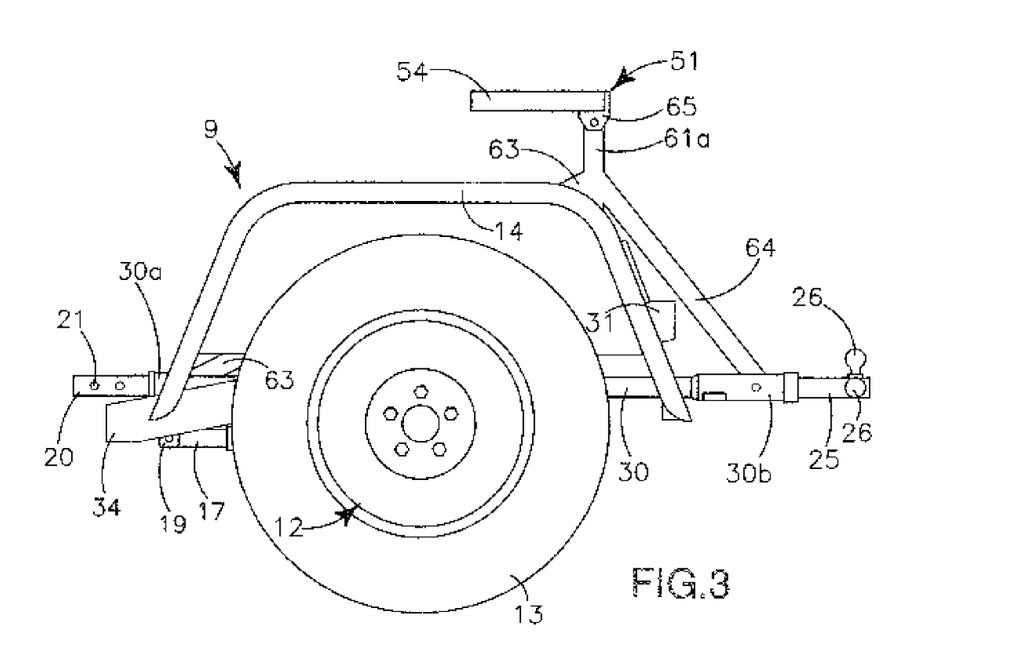
FIG. 3 is an orthographic driver's side view thereof.

In the preferred embodiment an air pump (not shown) and related electronics (not shown) are carried in a moisture proof and dust proof container 29, that is carried by the dolly frame 11 at a convenient location. Pneumatic lines (not shown) communicate between the air pump (not shown) and the airbags 41 allowing the airbags 41 to be inflated and deflated as desired. In the preferred embodiment the airbags 41 and pneumatic lines (not shown) are interconnected "in series" so that each airbag 41 has an equal amount of air pressure and inflation and deflation of both airbags 41 may be accomplished simultaneously and equally. Inflation of the airbags 41 is accomplished by adding pressurized air into the airbags 41 which causes the airbags 41 to expand generally axially and responsively pivot the rearward end portions 17b of the swing arms 17 away from a bottom portion of the tow dolly frame 11. Because the swing arms 17 are connected to the axle 10 and the wheels 12 and tires 13 carried by the axle 10 are in contact with the ground surface 74, the pivoting of the swing arms 17 responsive to the airbag 41 inflation causes the dolly frame 11 to move upwardly. The pneumatic lines (not shown) may also communicate with an air pressure gauge 31a preferably carried within a pressure gauge housing 31 so that a user may monitor the air pressure without the airbags and pneumatic components. In the preferred embodiment, the air pressure gauge housing 31 is carried on a bottom surface of the third transverse frame beam 37 and is visible to an operator from a rearward portion of the tow dolly 9. (FIG. 2). An air pressure drain valve (not shown) is also preferably carried within or proximate the pressure gauge housing 31 to allow an operator to drain air pressure from the pneumatic system.

In another embodiment (not shown) air shocks (not shown) may be used instead of air bags 41. The air shocks (not shown) communicate between the dolly frame 11 and the rearward end portions 17b of the swing arms 17 opposite the swing arm axles 18. Similarly, when pressurized air is added to the air shocks (not shown) the air shocks (not shown) expand axially increasing in length. The increase in the length of the air shocks (not shown) will similarly cause the rearward end portions 17b of the swing arms 17 to pivot away from the dolly frame 11 and responsively cause the dolly frame 11 to move upwardly increasing the height of the dolly frame 11 relative to the ground surface.

In a further embodiment (not shown), it is anticipated a one way pressurized air input valve (not shown) may be used in place of or in addition to the air pump (not shown). The one way pressurized air input valve (not shown) would pneumatically communicate with the air bags 41 or air shocks (not shown) and allow pressurized air to be added from an external source of pressurized air such as an air compressor at a service station. It is anticipated use of such a one way pressurized air input valve would reduce complexity and cost of the tow dolly 9 and would reduce maintenance. The one way pressurized air input valve is anticipated to be a valve similar to an air valve or an automotive tire/wheel which allows input of pressurized air as well as release of pressure from within the pneumatic system.

The support frame 51 is formed of a box beams and is carried spacedly vertically above the dolly frame 11 proximate the rearward end portion and extends generally parallel to the axle 10. The support frame 51 has an elongate first transverse beam 52 and an elongate second transverse beam 53. The first transverse beam 52 and the second transverse beam 53 are structurally interconnected to one another by plural spacer beams 54, 55, 56, 57, 58 that are perpendicular thereto and extend therebetween forming a generally planer "ladder" type structure wherein the plural spacer beams 54, 55, 56, 57, 58 form the "rungs" of the "ladder" type structure. Spaces 59 are defined between the spacer beams 54, 55, 56, 57, 58 and the first and second transverse beams 52, 53.

Figure 1:
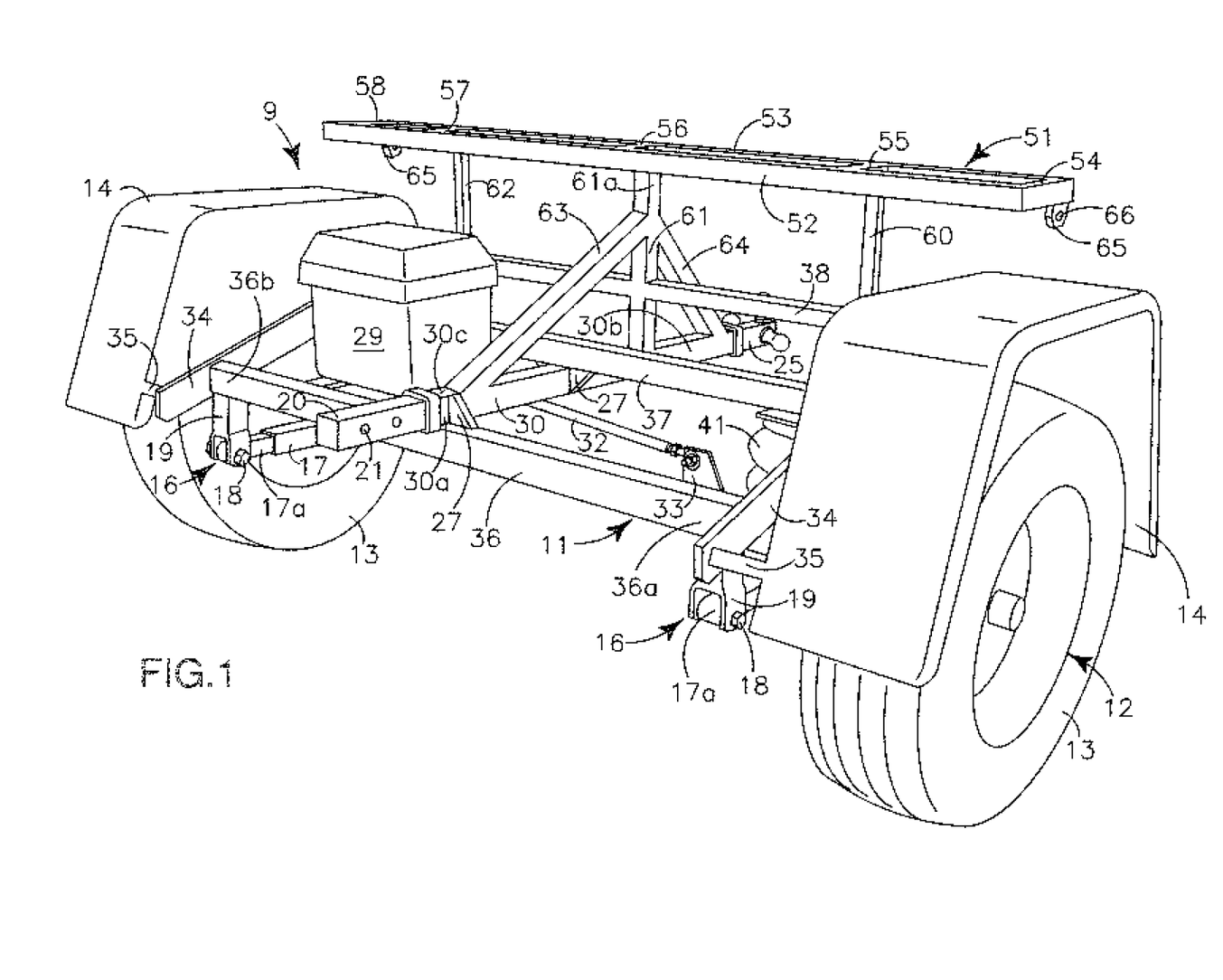
FIG. 1 is an isometric front, driver's side and top view of the weight transferring tow dolly.

Support legs 60 and 62 are vertical box beams and structurally communicate between an upper surface of the third transverse frame beam 38 spacedly adjacent the lateral end portions 36a and 36b thereof and a bottom surface of the support frame 51 second transverse beam 53. The support legs 60 and 62 are generally equally laterally spaced apart from the fender mounting beams 34 to distribute loads on the support frame 51 to the dolly frame 11. Support leg 61 is centrally positioned between support legs 60 and 62 and is preferably formed of a larger size box beam than support legs 60 and 62. Support leg 61 structurally communicates between a bottom surface of the support frame 51 second transverse beam 53 and the top surface 30c of the tow beam 30. As shown in FIGS. 1 and 2 the third transverse frame beam 38 structurally communicates with support leg 61. The structural interconnection therebetween preferably requires the third transverse frame beam 38 be cut into halves at a generally medial position, and the "cut ends" (not shown) be welded or otherwise permanently affixed to lateral side portions of support leg 61 spacedly above the tow beam 30. The structural interconnection of the third transverse frame beam 38 with support leg 61 provides additional lateral stability to the support leg 61 and the support frame 51. Forward angulated support 63 is a box beam and structurally communicates between upper surface 30c of the tow beam 30 proximate the forward end portion 30a, and a forward facing upper end portion 61a of support leg 61. Rear angulated support beam 64 structurally communicates between a rearward facing upper end portion 61a of support leg 61 and an upper surface of the receiver hitch 22 carried at the rearward end portion 30b of the tow beam 30. The forward angulated support 63 and the rear angulated support 62 provide forward and rearward rigidity to the support frame 51.

Fastener brackets 65 are structurally carried by the support frame 51 at opposing lateral end portions proximate the second transverse beam 53. The fastener brackets 65 define medial holes 66 for releasable engagement with fasteners that may extend to a truck camper 73 or a supported load.

Vehicle safety features such as, but not limited to, tail lights 15, safety chain loops 24, back-up lights (not shown) and the like may be carried by the tow dolly 9 as desired by the user to satisfy road safety regulations, and to accommodate the towing of another vehicle behind the tow dolly 9.

Having described the structure of my weight transferring tow dolly, its assembly and operation may be understood.

Assuming the tow dolly 9 is to be used in conjunction with a pickup truck carrying a truck camper 73, the truck camper 73 is first loaded into the truck bed and is secured therein by known means.

The weight transferring tow dolly 9 is positioned behind the towing vehicle 70 with the receiver hitch insert 20 axially aligned with the towing vehicle 70 towing hitch 72. If the vertical height of the support frame 51 of the weight transferring tow dolly 9 is too great to pass under a rearward end portion of the truck camper 73 the airbags 41 should be deflated so that the swing arms 17 pivot about the swing arm axles 18 and the height of the support frame 51 relative to the ground surface 74 is reduced so that the weight transferring tow dolly 9 may pass under the truck camper 73 the air bags 41 are deflated by operating the air pressure drain valve (not shown). Forward end portion of the receiver hitch insert 20 is inserted axially into the box beam medial channel (not shown) defined by the towing hitch 72 and locking pin holes 21 defined therein are aligned. A locking pin (not shown) is inserted through the aligned locking pin holes 21 and secured in place with known means such as a Kotter-Pin to secure the receiver hitch insert 20 within the towing hitch 72. The square cross-section configuration of the receiver hitch insert 20 and the box beam medial channel (not shown) of the towing hitch 72 cooperate with the locking pin (not shown) to prevent vertical, lateral, rotational or axial movement of the receiver hitch insert 20 relative to the towing hitch 72. Electrical connections (not shown) operatively communicating between the towing vehicle 70 and the weight transferring tow dolly 9 to power the tall lights 15, air pump (not shown) and other features such as back-up lights (not shown) are connected.

The air pump (not shown) which may electrically communicate with an electrical power system (not shown) of the towing vehicle 70, or have independent battery power, is activated which causes the air pump (not shown) to force pressurized air through pneumatic lines (not shown) and into the air bags 41. As pressurized air passes into the air bags 41, the airbags 41 expand axially causing the swing arms 17 to pivot about the swing arm axles 18. As the air bags 41 expand and the rearward end portions 17b of the swing arms 17 pivot away from the dolly frame 11, the vertical height of the dolly frame 11 and the support frame 51 relative to the ground surface (not shown) increases until an upper surface of the support frame 51 frictionally contacts a bottom surface (not shown) of the truck camper 73. As pressurized air continues to expand the air bags 41, the rearward end portions 17b of the swing arms 17 continue to pivot away from the dolly frame 11, and additional upward vertical pressure is exerted on the bottom surface (not shown) of the truck camper 73 proximate the rearward end portion of the truck camper 73. As vertical upward pressure is exerted on the bottom of the truck camper 73 proximate a rearward end portion thereof, the rear wheels of the towing vehicle 70 become pivot points (fulcrums) which causes additional vertical downward pressure to be exerted on the front wheels and tires (not shown) of the towing vehicle 70 which increases the stability of the towing vehicle 70. The weight of the truck camper 73 that is carried behind the rear wheels of the towing vehicle 70 is thereby partially supported by the tow dolly 9 and the upward pressure exerted by the tow dolly 9 on the bottom surface of the truck camper 73 forces the towing vehicles 70 front wheels and tires downwardly to enhance stability. Similarly the generally rigid interconnection of the tow dolly 9 with the towing vehicle 70 of the towing hitch 72 causes the weight of the load on the rear wheels of the towing vehicle to be at least partially shared with the wheels 12 and tires 13 of the tow dolly 9.

The process of detaching the weight transferring tow dolly 9 from the towing vehicle 70 is generally the reverse of the attaching process described in detail above and would be initiated by releasing the air pressure from the airbags and pneumatic components by opening the air pressure drain valve (not shown).

Construction and Materials of the Apparatus

The tow dolly frame 11, support frame 11 and related components are preferably formed of steel box beams that are welded to another to provide structural interconnections therebetween. In the preferred embodiment the dolly frame 11, support frame 11 and related components are finished with a powder coating to provide an attractive yet durable and wear resistant finish. The axle 10, wheels 12 and tires 13 are commercially available in a wide variety of sizes to satisfy the requirements of nearly any user. The air pump (not shown) pneumatic lines (not shown) and airbags 41 or air shocks (not shown) are also commercially available. The operating air pressure of the pneumatic system is dependent upon the desires of the operator, the weight and length of the load being carried in the truck bed (not shown) and the length and weight of the towing vehicle 70. In the preferred embodiment the tow dolly 9 and its various components are formed of steel box beams, however it is contemplated aluminum and various other metallic alloys may likewise be used in the manufacturing of the tow dolly 9.

Interpretation Notes

The above description has set out various features, functions, methods and other aspects of the invention. This has been done with regard to the currently preferred embodiments thereof. Time and further development may change the manner in which the various aspects are implemented. Such aspects may further be added to by the language of the claims which are incorporated by reference hereinto as originally filed. The scope of protection accorded the invention, as defined by the claims, is not intended to be necessarily limited to the specific sizes, shapes, features or other aspects of the currently preferred embodiment shown and described. The claimed invention may be implemented or embodied in other forms still being within the concepts shown, described and claimed herein. Also included are equivalents of the invention which can be made without departing from the scope or concepts properly protected hereby.

The foregoing description of my invention is necessarily of a detailed nature so that a specific embodiment of a best mode may be set forth as is required, but it is to be understood that various modifications of details, sizes, and rearrangement, substitution and multiplication of the parts may be resorted to without departing from its spirit, essence or scope.

What is claimed is:

1. A weight transferring tow dolly releasably attachable to a towing vehicle for transporting a load extending rearwardly from the towing vehicle, the weight transferring tow dolly comprising in combination:
    a rigid dolly frame having plural spaced apart transverse frame beams and a tow beam structurally interconnected to the plural transverse frame beams, the tow beam having a forward end portion carrying a receiver hitch insert for releasable engagement with the towing vehicle;
    a non-steering axle having wheels at each opposing end portion to support the rigid dolly frame spacedly above a supporting surface;
    a rigid support frame structurally interconnected to and spacedly positioned above the rigid dolly frame, the rigid support frame positionable beneath the load; and
    a suspension interconnecting the rigid dolly frame and the non-steering axle, the suspension having:
        a swing arm with a forward end portion and a rearward end portion, the forward end portion pivotally interconnected to a transverse frame beam of the rigid dolly frame so that the rearward end portion of the swing arm may pivot away from the rigid dolly frame toward a supporting surface to increase a vertical height of the rigid dolly frame and the rigid support frame relative to the supporting surface and apply a pressure to the load, and
        a pneumatic apparatus communicating between the rigid dolly frame and the swing arm to pivot the swing arm and the attached non-steering axle relative to the rigid dolly frame responsive to actuation of the pneumatic apparatus.

2. The weight transferring tow dolly of claim 1, wherein axial expansion of the pneumatic apparatus causes the rigid support frame to apply a vertically upwardly force to the load.

3. The weight transferring tow dolly of claim 1, wherein the rearward end portion of the swing arm is secured to the non-steering axle.

4. The weight transferring tow dolly of claim 3, wherein the pneumatic apparatus is positioned between the non-steering axle and one of the plural transverse frame beams.

5. The weight transferring tow dolly of claim 4, wherein the pneumatic apparatus is secured to the rearward end portion of the swing arm and the one of the plural transverse frame beams.

6. The weight transferring tow dolly of claim 4, wherein the pneumatic apparatus is an air bag.

7. A weight transferring tow dolly releasably attachable to a towing vehicle for supporting a load extending rearwardly from the towing vehicle, the weight transferring tow dolly comprising:
   a non-steering axle having wheels at each opposing end portion;
   a rigid dolly frame supported by the non-steering axle, the rigid dolly frame having plural spaced apart transverse frame beams and a tow beam rigidly connected to the plural transverse frame beams, the tow beam having a forward end portion releasably engageable with the towing vehicle;
   a rigid support frame rigidly connected to the rigid dolly frame, the rigid support frame positioned above the rigid dolly frame and positionable beneath the load; and
   a suspension interconnecting the rigid dolly frame and the non-steering axle, the suspension having:
      a swing arm with a first end portion and a second end portion, the first end portion pivotally connected to a first transverse frame beam of the plural transverse frame beams of the rigid dolly frame, the second end portion connected to the non-steering axle and pivotable relative to the first transverse frame beam; and
      a pneumatic apparatus positioned between the rigid dolly frame and the second end portion of the swing arm to increase a vertical height of the rigid support frame and apply a pressure to the load through the rigid support frame responsive to actuation of the pneumatic apparatus.

8. The weight transferring tow dolly of claim 7, wherein axial expansion of the pneumatic apparatus causes the rigid support frame to apply a vertically upwardly force to the load.

9. The weight transferring tow dolly of claim 7, wherein the first end portion of the swing arm is a forward end portion of the swing arm.

10. The weight transferring tow dolly of claim 7, wherein the second end portion of the swing arm is a rearward end portion of the swing arm.

11. The weight transferring tow dolly of claim 7, wherein the pneumatic apparatus is secured to the second end portion of the swing arm and a second transverse frame beam of the plural transverse frame beams.

12. The weight transferring tow dolly of claim 7, wherein the pneumatic apparatus is an air bag.

13. A weight transferring tow dolly releasably attachable to a towing vehicle for supporting a load extending rearwardly from the towing vehicle, the weight transferring tow dolly comprising:
   an axle having wheels at each opposing end portion;
   a rigid dolly frame supported by the axle, the rigid dolly frame having plural horizontally spaced apart transverse frame beams and a tow beam rigidly connected to the plural transverse frame beams, the tow beam having a forward end portion releasably engageable with the towing vehicle; and
   a rigid support frame horizontally and vertically rigidly connected to the rigid dolly frame, the rigid support frame positioned above the rigid dolly frame and vertically spaced from the plural transverse frame beams and positionable beneath the load, the rigid support frame vertically adjustable relative to the axle.

14. The weight transferring tow dolly of claim 13, further comprising a swing arm and a pneumatic apparatus interconnecting the rigid dolly frame and the axle.

15. The weight transferring tow dolly of claim 14, wherein axial expansion of the pneumatic apparatus causes the rigid support frame to apply a vertically upwardly force to the load.

16. The weight transferring tow dolly of claim 14, wherein the swing arm includes a first end portion pivotally connected to a first transverse frame beam of the plural transverse frame beams.

17. The weight transferring tow dolly of claim 16, wherein the swing arm includes a second end portion connected to the axle, wherein the second end portion and the axle are pivotable relative to the first transverse frame beam.

18. The weight transferring tow dolly of claim 17, wherein the pneumatic apparatus is positioned between and secured to the second end portion of the swing arm and a second transverse frame beam of the plural transverse frame beams.

19. The weight transferring tow dolly of claim 13, wherein the plural transverse frame beams includes a first forward transverse frame beam, a second medial transverse frame beam positioned vertically higher than the first transverse frame beam, and a third transverse frame beam positioned vertically higher than the second transverse frame beam.

20. The weight transferring tow dolly of claim 19, wherein the tow beam extends generally perpendicular to and is positioned generally medially between end portions of the first forward transverse frame beam, the second medial transverse frame beam, and the third transverse frame beam.

\* \* \* \* \*